July 26, 1927. 1,636,788

E. SCHLECK

ELECTRIC STEAM BOILER

Filed Jan. 16, 1926

Wittnesses

Inventor
Edward Schleck

Patented July 26, 1927.

1,636,788

UNITED STATES PATENT OFFICE.

EDUARD SCHLECK, OF BERLIN, GERMANY.

ELECTRIC STEAM BOILER.

Application filed January 16, 1926, Serial No. 81,821, and in Germany October 24, 1924.

This invention relates to a boiler electrically heated after the electrode principle and comprising steam generating apparatus, the inner electrode of which dipping into the liquid contained in the outer electrode and designed to be heated. In boilers of this type working polyphase current the voltage of each of the three phases is neutralized or converted into heat in only one steam generator. The necessity of neutralizing the voltage in only one steam generator makes the regulating of the efficiency extraordinarily difficult, especially at higher voltages, as these require a long resistance distance towards all sides. The necessary long resistance distances can however only be obtained by correspondingly lengthening of the diameter and enlargement of the liquid reservoir which forms the outer electrode. As the efficiency increases with the cross section of the liquid, the efficiency cannot be decreased beyond a certain degree owing to the very great liquid cross section and to the very high voltages. It has been proposed to reduce the liquid cross section by displacement of the liquid by means of insulating bodies of porcelain or the like inserted into the outer electrode, in order to reduce thus the efficiency to the desired degree, but very large expensive and heavy porcelain bodies are required whereby the cost of installation is increased so much that in many cases it is impossible to use these means.

For extraordinarily high voltages, for instance 10,000 volts, the apparatus which forms the outer electrodes are of very great dimensions and weight which renders the whole unpractical. A further fact to be taken into consideration is that liquid receptacles of this size cannot be inserted as a whole through the manhole but in different pieces to be put together in the boiler whereby the building up of the plant is rendered more difficult.

The invention consists essentially in that the voltages of each of the phases are not neutralized in one steam generator only, but in several series-connected steam generating apparatus wherefrom results the great advantage that the diameter of the steam generator is considerably reduced as the inner electrodes can be made to dip more deeply into the liquid in the outer cup-shaped electrodes, the desired effect being not produced only by the ends of the inner electrodes but by the entire much longer submerged portion of said inner electrodes. The efficiency can be regulated in very wide limits by regulating the liquid level accordingly, the efficiency being less great at a low liquid level and greater at higher liquid level. This is the same in the single generator system, but the regulating height of the liquid level is no longer produced by displacement of the liquid by inserted porcelain bodies but it is obtained without the use of such bodies in the numerous, much narrower, series-connected steam generating apparatus.

According to the invention electrically insulated tubular elements are inserted between the lower supply pipe common for each phase and the outer cup-shaped electrode, the liquid being supplied from below in a manner known per se, so that the voltage between phase and zero point is not short-circuited, as the supply tube common for each phase forms the zero point or is electrically connected with the same. The tubular insulating elements may be arranged either in the direction of the electrodes or transversely to the same. If the insulating tubes are mounted in the longitudinal direction of the electrodes they serve to prevent short circuits, between the phases and the common supply pipe. The insulating tubes may become shorter from steam generator to steam generator in accordance with the voltage drop from one steam generator to the other.

If the insulating bodies are transversely to the electrodes they are designed to prevent short circuits between the successive steam generators.

Several embodiments of the invention are illustrated in the accompanying drawings in which—

Fig. 1 shows in a longitudinal section on line A—B of Fig. 2 and

Fig. 2 in cross section on line C—D of Fig. 1 the improved boiler in which the series-connected steam generators are mounted on insulating elements.

Figure 5:
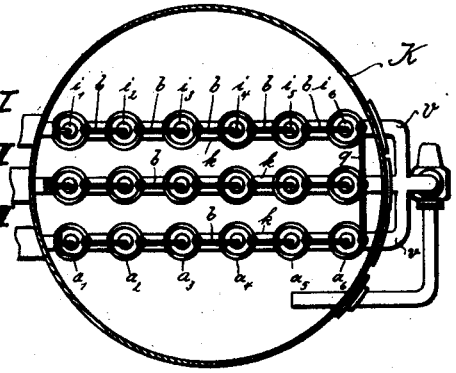
Figure 3:
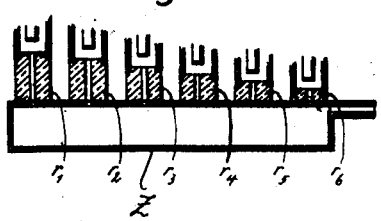
Fig. 3 shows how these insulating elements get gradually shorter.

Fig. 5 in cross section a boiler with transverse insulating elements.

Each of the conductors I, II, III of the three phases of a polyphase net $i$—$s$ conducted over one row of series-connected steam generators, $d^1$, $d^2$, $d^3$, $d^4$, $d^5$, $d^6$. More or less steam generators than shown may be provided, at least two being however required according to the invention. The current flows through the inner electrode $i^1$ of the steam generator $d^1$, through the liquid $f$ contained in this generator to the outer electrode $a^1$, thence through a metal bridge $b$ to the inner electrode $i^2$ of the second steam generator $d^2$ and so forth until its voltage on the cross conductor $q$ which connects the outer electrode of the extreme steam generator has become equal to zero. It is not absolutely necessary to lead the current first to the first inner electrode, it might be led first to the outer electrode, and through the liquid to the inner electrode. Whilst in the commonly used steam generators with only one single outer cup-shaped electrode the current was consumed at passing through the liquid enclosed between the only inner electrode and the only outer electrode of one phase, e. g. reduced to zero as regards voltage, the voltage E in the improved boiler is reduced in each of the series of $n$ connected steam generators only of $\frac{E}{n}$. If, as shown in the drawings, six narrow steam generators are, for instance, arranged in each phase row, the current which enters into the first steam generator with the voltage E enters into the second steam generator only with the voltage $E - \frac{E}{n}$, into the third steam generator with the voltage $E - \frac{2E}{n}$ and so forth. As the several steam generators are very long in proportion to their diameter and as, on the other hand, the efficiency increases with the higher liquid level the efficiency can be perfectly regulated. A further advantage is that the outer electrodes consist of seamless, comparatively thin-walled iron tubes which are much cheaper than one cup-shaped outer electrode of the boilers of known type, one such outer electrode being required for each phase.

The long and narrow steam generators of the improved boiler can be put together outside the boiler and inserted as a whole through the manhole, so that the difficult insertion into and putting together in the boiler is avoided. From the thin tubes a uniform steam generator can be produced which is adapted for any voltages. For higher voltages it is merely necessary to insert a greater number of steam generators than for lower voltages, wherefrom results a considerable simplification of the project and of the practical carrying out of the boiler plant.

Figure 1:
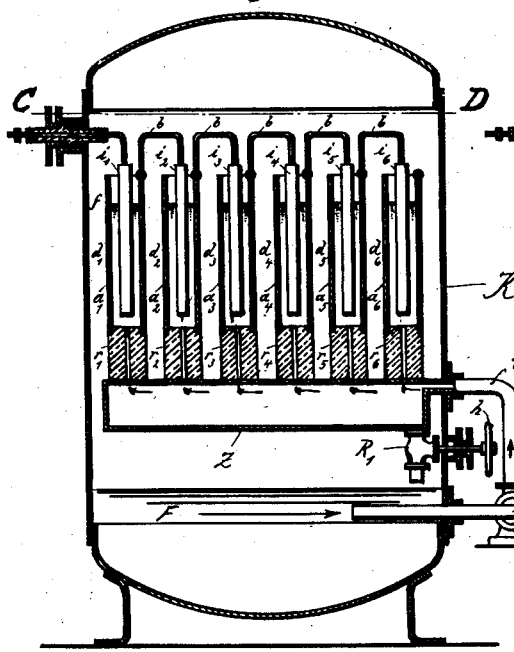

As shown in Fig. 1 the cup shaped outer electrodes $a^1$, $a^2$ ... $a^6$ are mounted on insulating tubes $r^1$, $r^2$ ... $r^6$ arranged in the direction of the longitudinal axis of the steam generators and designed to prevent the current jumping over onto the supply pipe which is common for each row of steam generators. As the voltage decreases from steam generator to steam generator the length of the insulating tubes may decrease from steam generator to steam generator in accordance with the drop of voltage, so that unnecessarily long insulating tubes are avoided.

Figure 4:
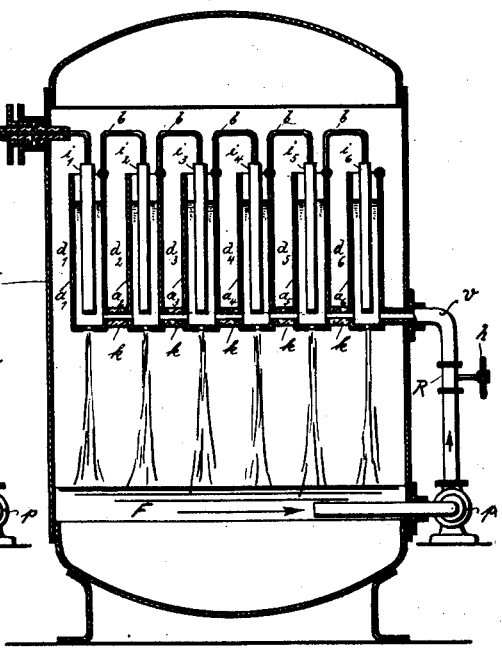
Fig. 4 shows in vertical section.
Figure 2:
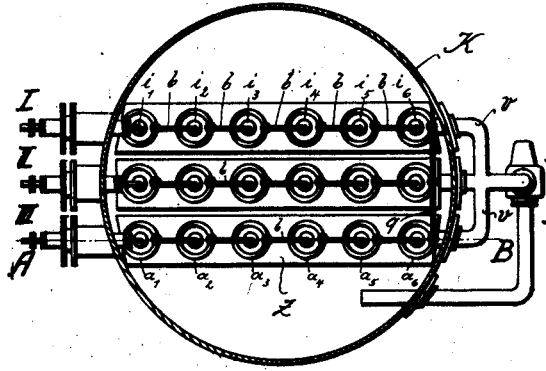

As shown in Figs. 4 and 5 only short insulating tubes $k$ are required if they are arranged transversely to the steam generators, as these tubes have to resist not to a voltage from the maximum value to zero value but only to the voltage $\frac{E}{n}$. The short insulating tubes $k$ form at the same time the common water supply pipe so that the separate lower pipe $z$ shown in Fig. 1 is omitted. The water F in the boiler K is forced, in the usual manner, by a centrifugal pump $p$ into the distributing conduit $v$. As shown in Fig. 1 before the water in excess can enter into the first steam generator it flows off through a tubular socket $s$ extending into the boiler K and comprising a regulating valve $R^1$. This valve can be easily controlled from the outer side of the boiler by means of a hand wheel $h$ so that the water level in the steam generators is either maintained on a predetermined height or drops and rises in accordance with the desired efficiency. In all other types of electrically heated boilers it is also possible to regulate the water level in a similar manner, but in the improved boiler the regulation takes place at the inflow before the water has traversed a steam generator. The regulation of the water supply is therefore independent of the uniform outflow holes of the steam generator.

What I claim as new and desire to secure by Letters Patent of the United States is:

1. In an electrically heated boiler the combination of steam generating apparatus arranged in the boiler, consisting of several outer vessels serving as electrodes and of inner electrodes inserted into said outer vessels, and means permitting of series-connecting the electrodes like a battery in such a manner that the outer electrode of the first steam generating apparatus is electrically connected with the inner electrode of the second apparatus and so forth.

2. In an electrically heated boiler the combination of steam generating apparatus arranged in the boiler, consisting of several outer vessels serving as electrodes and of inner electrodes inserted into said outer vessels, and means to combine in the boiler in order to use a polyphase current, several steam generating apparatus according to the phase number and series-connected like a battery, the last electrodes of the several phases being electrically connected with one another to form a zero conductor.

3. In an electrically heated boiler the combination of steam generating apparatus arranged in the boiler, consisting of several outer vessels serving as electrodes and of inner electrodes inserted into said outer vessels of electrodes series-connected like a battery, and of insulating tubes separating from one another the several steam generating apparatus.

4. In an electrically heated boiler the combination of steam generating apparatus arranged in the boiler, consisting of several outer vessels serving as electrodes and of inner electrodes inserted into said outer vessels of electrodes series-connected like a battery, and of insulating tubes separating from one another the several steam generating apparatus said insulating tubes forming at the same time the connection of the several steam generating apparatus with the common water supply pipe.

5. In an electrically heated boiler the combination of steam generating apparatus arranged in the boiler, consisting of several outer vessels serving as electrodes and of inner electrodes inserted into said outer vessels of electrodes series-connected like a battery, and of insulating tubes inserted between the several steam generating apparatus and forming the common water supply tube.

6. In an electrically heated boiler the combination of steam generating apparatus arranged in the boiler, consisting of several outer vessels serving as electrodes and of inner electrodes inserted into said outer vessels of electrodes series-connected like a battery, and of insulating tubes connecting the several steam generating apparatus with the common water supply pipe and being of gradually decreasing height in accordance with the drop of voltage from steam generator to steam generator.

7. In an electrically heated boiler the combination of steam generating apparatus arranged in the boiler, consisting of several outer vessels serving as electrodes and of inner electrodes inserted into said outer vessels of electrodes series-connected like a battery, and of a water supply pipe controlled by a pump and common to several steam generating apparatus, of an outflow pipe connected with the common water supply pipe, and of shutting off element arranged in said outflow pipe and adapted to be operated from the outer side of the boiler by which shutting off element the water supply can be regulated before the water flows into the steam generating apparatus.

Signed at Berlin, Germany, this 31st day of December, 1925.

EDUARD SCHLECK.